United States Patent
Giannoulidis et al.

(10) Patent No.: US 6,201,826 B1
(45) Date of Patent: Mar. 13, 2001

(54) LOADING SYSTEM FOR ELECTRIC ARC FURNACES

(75) Inventors: Ioannis Giannoulidis, Certosa di Pavia; Angelico Della Negra, Povoletto; Matteo Vittorio Losciale, Udine, all of (IT)

(73) Assignee: Danieli & C. Officine Meccaniche SpA (IT)

( * ) Notice: Subject to any disclaimer, the term of this patent is extended or adjusted under 35 U.S.C. 154(b) by 0 days.

(21) Appl. No.: 09/424,489

(22) PCT Filed: May 8, 1998

(86) PCT No.: PCT/IB98/00685
§ 371 Date: Nov. 23, 1999
§ 102(e) Date: Nov. 23, 1999

(87) PCT Pub. No.: WO98/53106
PCT Pub. Date: Nov. 26, 1998

(30) Foreign Application Priority Data

May 23, 1997 (IT) .............................. UD97A0098

(51) Int. Cl.[7] .................. F27D 23/00; F27D 3/00
(52) U.S. Cl. ................................. 373/78; 373/79
(58) Field of Search .................... 373/78, 79, 80

(56) References Cited

U.S. PATENT DOCUMENTS

| | | | |
|---|---|---|---|
| 4,390,168 | * 6/1983 | Muller | 373/78 |
| 4,466,104 | * 8/1984 | Walzel | 373/78 |
| 4,471,487 | * 9/1984 | Hoffmann et al. | 373/78 |
| 5,390,212 | * 2/1995 | Bonnet et al. | 373/79 |
| 5,416,792 | * 5/1995 | Vice | 373/80 |
| 5,581,574 | * 12/1996 | Vice | 373/80 |
| 6,038,246 | * 3/2000 | Shimizu et al. | 373/78 |

FOREIGN PATENT DOCUMENTS 9632616  10/1996  (WO) .

* cited by examiner

Primary Examiner—Tu Ba Hoang
(74) Attorney, Agent, or Firm—Antonelli, Terry, Stout & Kraus, LLP (57) ABSTRACT

Loading system for an electric arc furnace (11) includes a loading station (20a), a pre-heating station (20b) and a pick-up and moving device (15) provided with an arm (17) rotating on a circumference on which the furnace (11), the loading station (20a) and the pre-heating station (20b) lie. The loading station (20a) being distanced from the pre-heating station (20b), the loading element (16) being suitable to be located in or removed from each of the loading (20a) and pre-heating (20b) stations. The manipulator arm (17) also is suitable to be moved vertically to move the loading element (16) between the loading station (20a), the pre-heating station (20b) and a position above the furnace (11), in the pre-heating station (20b) the container (12, 112, 212) being suitable to cooperate with the air-tight cover (23) and at the lower part with a combustion chamber (21) The air-tight cover (23) is movable both vertically and rotatably on a horizontal plane, the fume-discharge conduit (22) being at least partly coaxial with the axis of rotation of the air-tight cover (23).

13 Claims, 5 Drawing Sheets

LOADING SYSTEM FOR ELECTRIC ARC FURNACES

FIELD OF APPLICATION

The invention is applied in the field of steel production to load electric furnaces with scrap, or base material similar to scrap, which is pre-heated by means of the fumes leaving the electric furnaces themselves and flowing from the top downwards.

The electric arc furnaces to which the invention is applied can be of the type fed by either direct or alternating current.

The invention can be employed both on new installations appropriately prepared, and also for revamping of existing installations using furnaces of a conventional type.

The invention makes it possible to reduce the times required to open the roof of the furnace in order to load it, limiting heat losses from inside the furnace towards the outer environment.

Moreover, the invention makes it possible to automate the movements needed to load the furnace, to drastically reduce the times of the cycle by reducing the stoppages of the furnace, to limit the movements and equipment necessary for loading, to reduce the spaces occupied at the sides of the furnace, and also to use loading baskets of either small or large capacity according to availability.

A further advantage of the invention is that, in order to pre-heat the scrap and unload it into the furnace, it is possible to use directly the baskets arriving from the scrap accumulation store or baskets which are loaded when they are already positioned in the pre-heating station; the baskets may be of variable shape, size and type, and do not require stationary supporting structures when they are in the pre-heating position near the furnace.

STATE OF THE ART

The state of the art includes electric arc furnaces used to produce steel from scrap and regenerated material of various types.

In the state of the art, the furnaces can be loaded continuously, for example by means of conveying means such as a belt, connected with the inside of the furnace and fed continuously with fresh scrap which gradually replaces that already loaded into the furnace.

In another solution, the furnaces are loaded moving means, for example bridge cranes, in correspondence with the mouth of the furnace which is kept temporally open.

The bottom of the basket is then opened and the material is unloaded inside the furnace. For this purpose the baskets are equipped at the bottom with movable doors, valves, teeth, sliding grates or other appropriate opening system.

Systems using baskets for loading the furnace which are known to the state of the art have a plurality of disadvantages.

Firstly, it takes a long time to load the furnace due to the combination of movements required to open the furnace and position the basket; this causes a considerable heat loss from inside the furnace towards the outside, and also the leakage into the surrounding environment of fumes containing powders, particles and other pollutants.

A further disadvantage is that if the scrap is loaded cold into the furnace, it takes longer to melt and causes problems for the penetration of the electrodes.

At present, in some steel plants the furnaces are loaded with scrap which is pre-heated by the heat of the fumes discharged from the furnace itself through the fourth hole on the roof.

Loading systems known to the state of the art where the scrap is pre-heated use loading baskets located in the appropriate rooms into which the fumes are conveyed before they are purified and discharged by the appropriate plants.

There are also solutions known to the state of the art which include a single room which contains several loading baskets, or several rooms connected to each other, each one of which contains a single loading basket.

These systems cause problems in the structuring of the rooms, the movements of the baskets and wear on the baskets too.

Moreover, in the case of baskets heated inside the room, the scrap loses part of the heat it has accumulated, both when it is removed from the room and when it is transported to near the mouth of the furnace and also when it is unloaded into the furnace, from which there is always and in any case a considerable heat loss. The scrap moreover is not heated uniformly from one basket to the next.

These systems furthermore are not very functional, they are very expensive, and they take up a great deal of space inside the plant.

A further disadvantage is that the pre-heating rooms are normally located in positions which are not very near the furnace, and therefore the times needed to transport the baskets from this position to the furnace are very long and the heat losses are very high.

WO 96/32616 teaches to heat the scrap in a container which is solid with a movement structure, the scrap being heated from the bottom upwards.

This teaching does not give the advantages of heating the scrap from the top downwards, it does not allow the use of autonomous baskets, nor does it allow easy maintenance operations.

WO 92/10594 uses a manipulation tower comprising at least a rotary arm which is used to position a container full of scrap from a pre-heating position to a position wherein the scrap is loaded into the furnace, and vice versa.

WO'594 includes a pre-heating environment which is open at the top and at the bottom, inside of which a loading container, with a bottom which can be opened, is positioned.

The pre-heating environment is located on a stationary base which constitutes a pedestal arranged in proximity with the furnace; it is associated, in the pre-heating position, with air-tight closing means to close its ends, and means to introduce and discharge the pre-heating fumes taken from the furnace.

The pre-heating environment includes a mantle which flares towards the bottom and which is connected to the lower pedestal so as to constitute an air-tight seal.

The pedestal communicates with a lower chamber wherein the fumes pass and are combusted.

The hot fumes emerging from the furnace are first directed into the combustion chamber below the pre-heating container where they are burnt, and then conveyed through the appropriate ducts, either inside the container from the top downwards, during the pre-heating step, or they are directed towards the discharge plant, during the movement or filling of the container itself.

This solution involves expensive and complex fitting of the pipes, difficulties of installation, loss of temperature on the part of the fumes which, due to the long and tortuous path they have to follow, are cooler when they reach the scrap.

Moreover, this solution involves problems of pollution and wear of the filter systems because after the fumes have passed through the scrap, they are sent directly to the treatment and discharge plant, and therefore they carry with them all the powders, slag and particles which they have absorbed during their passage through the container.

Generally speaking, the solution given by WO'594 does not make it possible, or at least easy, to use loading baskets of any shape and size whatsoever, given that the baskets need to be inserted inside the pre-heating environment arranged resting on the stationary base.

EP-A-629830 provides a variant to WO'594 where the fumes are introduced into the container full of scrap from the top downwards, and where there is a pre-combustion of the fumes entering the container and also a post-combustion of the fumes as they emerge therefrom.

WO 95/12690 describes a movement system with a rotary tower for containers in which to pre-heat the scrap; the system does not use baskets of the removable type but a substantially stationary single-block structure, which involves obvious limitations to the versatility, flexibility and operativity of the plant.

Moreover, the means by which the pre-heating fumes are treated and discharged after they have passed through the container of scrap are not explained.

FR-A-2.435.684 includes a movement system with articulated arms associated with a movable structure which can be translated above a melting furnace.

This document does not include any pre-heating of the scrap or any processes to convey and discharge the fumes.

EP-A-287.550 provides a procedure to pre-heat several baskets or containers arranged in proximity with the furnace which are then positioned and moved by means of a bridge crane so as to carry out loading operations.

All these documents do not give a completely versatile and flexible solution, which is practical, gives a high performance, and which can be adapted to various types of installations and plants, which is limited in overall bulk and requires only limited civil engineering works in its preparation.

The present applicant has designed, tested and embodied this invention to overcome the shortcomings of the state of the art and to obtain further advantages.

DISCLOSURE OF THE INVENTION

The invention is set forth and characterised in the main claim, while the dependent claims describe variants of the idea of the main embodiment.

The purpose of the invention is to provide a loading system for electric arc furnaces which will give an automated and functional operating cycle, which will allow the use of scrap pre-heated by the fumes leaving the furnace, and which will involve shorter opening times of the furnace.

Another purpose of the invention is to achieve a loading system for furnaces which will limit the space occupied above and at the sides of the furnace and which will be easily adaptable to existing structures, without requiring substantial modifications to the basic plant of the furnace.

A further purpose is to supply a system which will allow the furnace to be loaded both by means of baskets of a substantially conventional type and also by means of suitable containers cooperating with the relative systems to feed the scrap.

Yet another purpose of the invention is to have a conduit for the fumes which can by-pass the pre-heating basket to send the fumes directly to the chimney without passing through the baskets.

A further purpose of the invention is to use baskets of substantially any type or shape whatsoever.

Yet another purpose is to obviate the need for stationary structures or a pedestal on which the baskets are supported and to which they are adapted.

A further purpose is to include a direct connection, which may yet be excluded and by-passed, between the fourth hole of the furnace and the upper part of the basket, so that the fumes can be introduced into the basket at the highest possible temperature and can thus provide the maximum supply of available energy.

Another purpose is to minimise the pollutant content of the fumes emerging from the basket containing the scrap in such a way as to preserve the plant which treats and discharges the fumes, and minimise the deterioration thereof.

A further purpose is to prevent environmental pollution during the transport of the basket from the pre-heating position to the position where the scrap is unloaded into the furnace.

The invention uses a device to pick up and move the loading elements of the furnace, whether they be baskets or containers.

The pick up/moving device comprises at least a manipulator arm rotating with respect to a central position or pin.

According to a variant, the pick up/moving device is of the type with two arms and such as to allow the simultaneous movement of two baskets, thus reducing to a minimum the time when no pre-heating is being carried out, which always affects at least one of the two baskets.

The pick up/moving device is arranged at the side of and in proximity to the furnace and cooperates with a plurality of housing stations for the loading elements which are arranged on the circumference having as its centre the pin around which the manipulator arm rotates; the electric furnace itself is also arranged on this circumference.

The loading basket is positioned directly suspended over the gripper elements of the arms; the gripper elements are configured as forks and cooperate with hook elements present advantageously opposite each other on the outer wall of the basket.

According to a variant, the gripper elements of the arms are at least partly adjustable and allow baskets of different size and shape to be positioned and supported.

According to the invention, there are two stations to house a single loading element, or basket, to load the furnace: a first loading station in which the loading element is filled with scrap, and a second different station for pre-heating the scrap in which the loading element is connected to the conduit to discharge the fumes from the furnace.

In a second embodiment, there are at least two housing stations for the relative loading elements; the loading step and the pre-heating step are carried out alternately in these two stations.

In this embodiment, the conduit to discharge the fumes from the furnace is articulated and/or telescopic, and is arranged in cooperation with one or another of the two stations according to the work step in progress.

In another embodiment, there are at least three stations for at least two loading elements.

In this embodiment, apart from the loading and pre-heating stations, there is at least one supplementary station, where the loading element is arranged, once the scrap has been unloaded into the furnace, while it is waiting to be arranged in the loading station.

The supplementary, waiting station allows the other loading element to be moved by the manipulator arm from the loading station to the pre-heating station.

According to a variant, a carrier system to transport the scrap cooperates with the supplementary waiting station, and fills with scrap the loading element located there.

Another embodiment includes a plurality of loading and pre-heating stations cooperating with one or more manipulator arms; this embodiment allows smaller baskets, which are easier to manoeuvre, to be used to load the furnace The systems used to load the scrap can be of various types according to the characteristics of the plant, the loading element employed, and other contingent requirements.

The systems can for example include bridge cranes, crane carriers with buckets or conveyor belts.

The configuration of the loading system according to the invention, and therefore the number and arrangement of the housing stations and the type and number of loading elements, can be modified according to the requirements of use and/or the existing structures to which the system has to be applied.

However, the invention ensures a coordinated, rapid and functional loading cycle for the furnace, it also reduces the opening times of the furnace and it exploits the fumes from the furnace to pre-heat the scrap.

According to a further variant, the fume conveyor conduit includes ventilators and/or burners which intervene in the combustion of the CO contained in the fumes and increase its calorific power.

According to a variant, the fume conveyor conduit is connected at the end to a movable structure which functions as a cover for the basket at least during the pre-heating step.

ILLUSTRATION OF THE DRAWINGS

The attached figures are given as a non-restrictive example and show some preferred embodiments of the invention as follows:

FIG. 4b shows a variant of FIG. 4a;

DESCRIPTION OF THE DRAWINGS

The system 10 according to the invention is associated, in this case, with an electric furnace 11 fed by alternating current, although the invention can also be applied to electric furnaces operating with direct current.

The system 10 provides for the loading of the furnace 11 with scrap, or other raw material similar to scrap, which has been pre-heated by the fumes derived from the melting process inside the furnace 11 itself.

The pre-heated scrap is contained inside loading elements 16 which can be associated with a pick up and moving device 15.

In FIGS. 1–4, the loading element 16 of the furnace 11 consists of a removable basket 12, having a capacity correlated to the volume of scrap which has to be introduced into the furnace 11 for every melting cycle, inside which the scrap is unloaded by means of containers 13, which may also be baskets similar to the basket 12 and which are moved on a bridge crane 14.

According to a variant, the loading element 16 consists of specialised removable containers 12.

The upper end of the baskets or containers 12 is open, and the lower end is partly closed by movable elements such as blades, grids, valves or similar which retain the scrap contained inside yet at the same time allow the fumes to pass.

Figure 5:
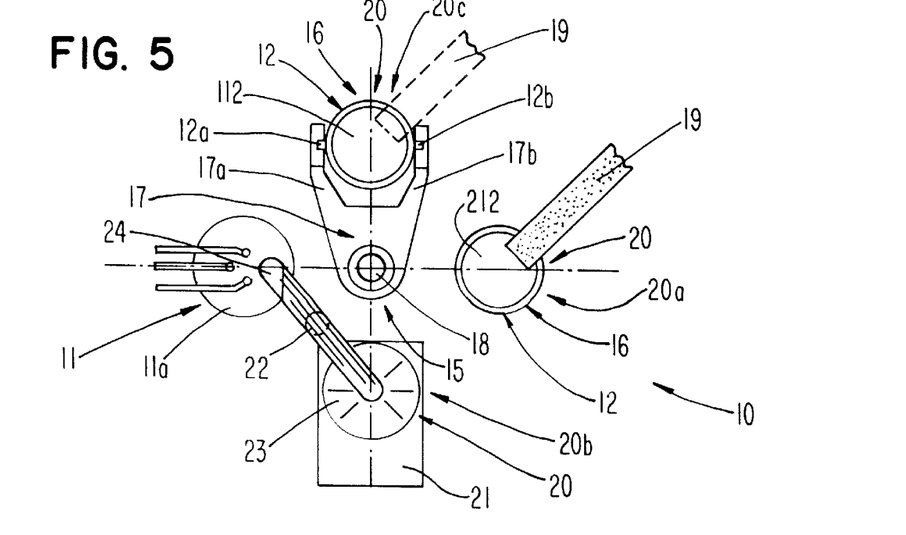
FIG. 5 shows in diagram form a variant of the loading system for electric arc furnaces according to the invention.

According to the variant shown in FIG. 5, the loading element 16 is filled by means of a conveyor belt 19.

According to another variant which is not shown here, the loading element 16 is filled by means of a crane with buckets.

The pick up and moving device 15 comprises, in the embodiment shown in FIGS. 1–6, a manipulator arm 17 mounted rotary and vertically mobile around a central pin 18.

The manipulator arm 17 has two extensions 17a, 17b, substantially shaped like a fork, which can be constrained at the ends to respective hook-type connection elements 12a, 12b made at the side on the outer wall of the container 12, advantageously opposite one another.

According to a variant, the fork-type extensions 17a, 17b may be adjusted at least partly, so as to enable the use of removable baskets or containers 12 of different size and/or shape.

The central pin 18 is arranged at the side of the electric furnace 11 and cooperates with stations 20 to house the containers 12; the various operations to prepare the scrap take place in these stations 20, which are arranged on the circumference having the central pin 18 as the centre, the furnace 11 itself being on the same circumference.

In the solutions shown in FIGS. 1–4, the loading system 10 has two stations 20, respectively the loading station 20a and the pre-heating station 20b, and a single container 12.

Figure 1:
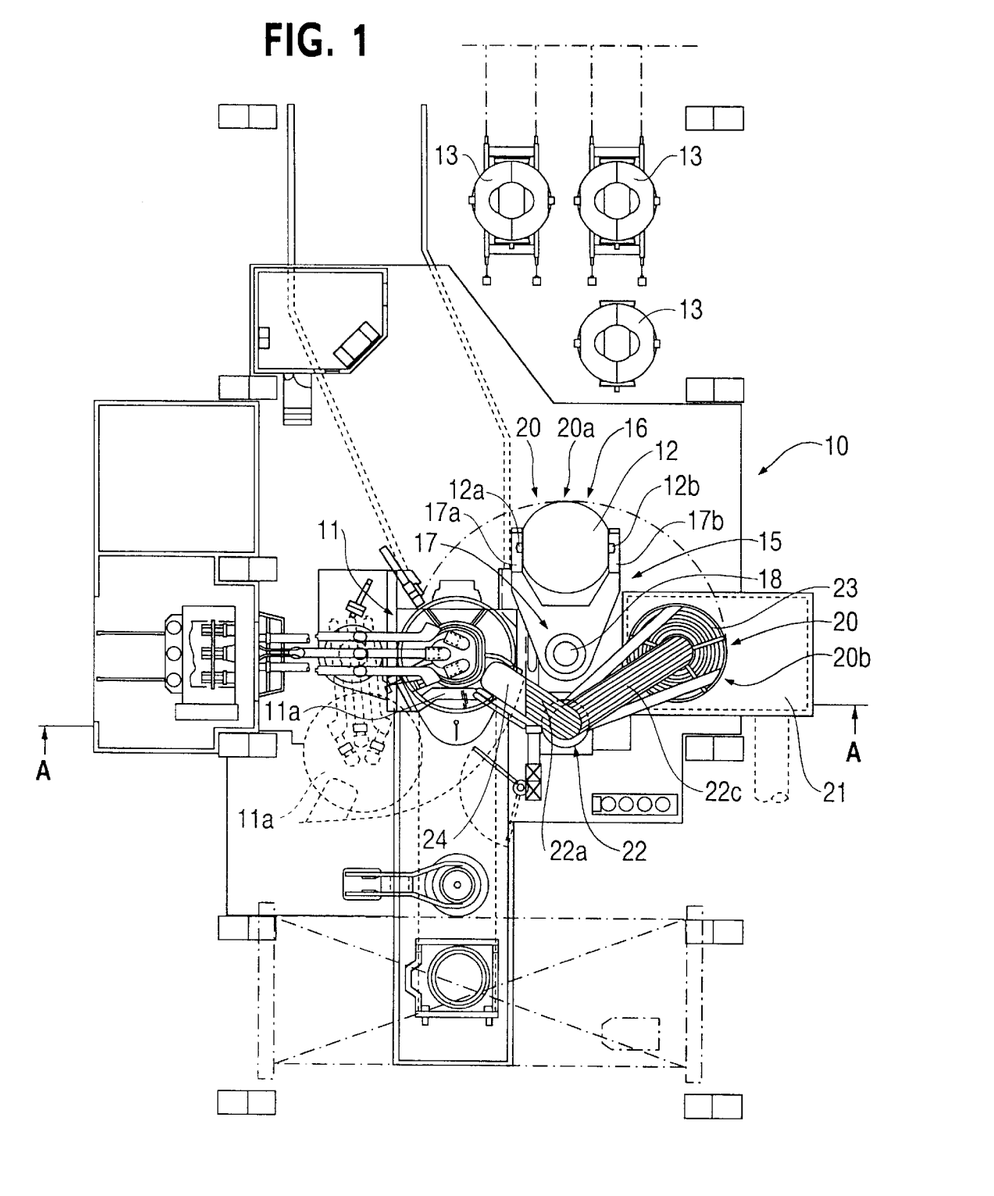
FIG. 1 shows a view from above of an electric arc furnace using the loading system according to the invention.
Figure 2:
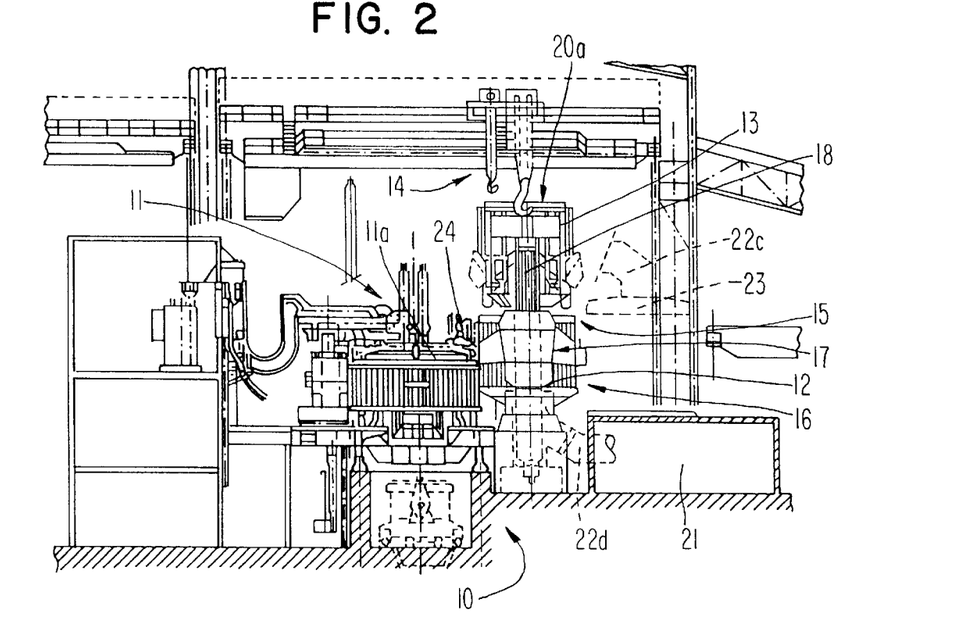
FIG. 2 shows a section from A to A of FIG. 1.
Figure 3:
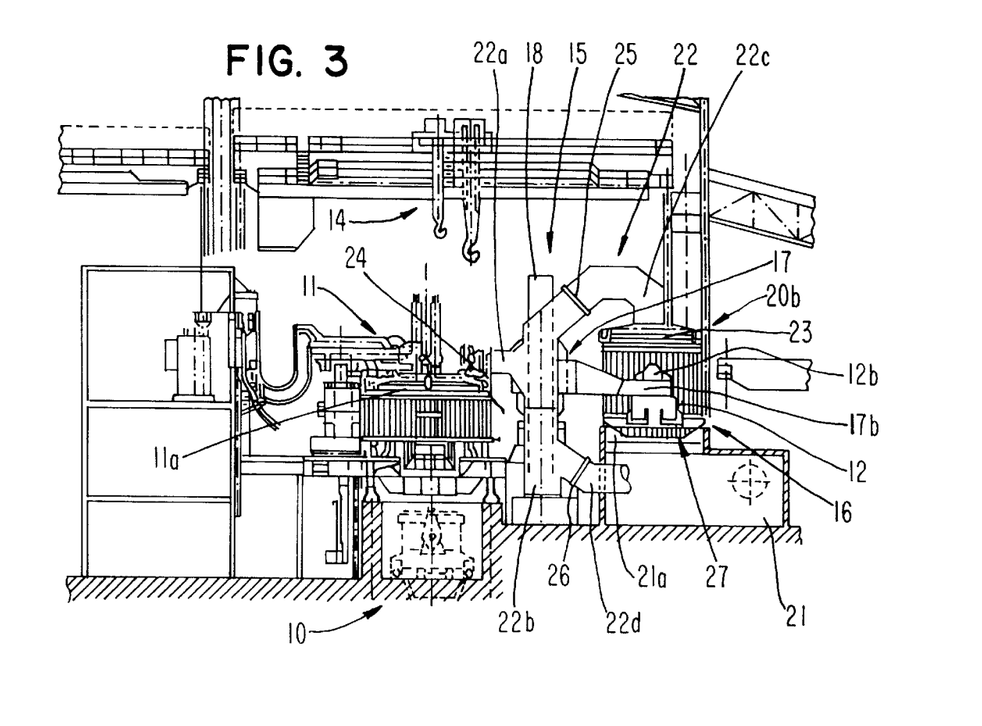
FIGS. 3 and 4a show a section from A to A of FIG. 1 in two successive steps of the loading cycle of the furnace.

In the loading station 20a, the container or basket 12 is filled by baskets 13 which can move on a bridge crane 14 with scrap arriving from the storage zone (FIG. 2).

Once the container 12 has been filled, the manipulator arm 17 moves the container 12 to the adjacent pre-heating station 20b (FIG. 3), where the container 12 is associated with an air-tight cover 23 connected with the conduit to discharge fumes 22 from the furnace 11 and movable vertically and rotatable around a vertical axis.

The fume discharge conduit 22 comprises a first segment 22a connected to the tubular element 24 associated with the fourth hole on the roof 11a of the furnace 11, a second, substantially vertical segment 22b, and two branches, the upper branch 22c and the lower branch 22d, which derive from the second segment 22b.

The upper branch 22c, which has at least a segment coaxial to the vertical axis of rotation of the air-tight cover 23, is associated at the end to the air-tight cover 23 and has a closure valve 25 at an intermediate point.

The lower branch 22d is associated at the end with a combustion chamber 21 for the fumes associated with the systems to discharge the fumes and has a closure valve 26 at an intermediate point.

The fume combustion chamber 21 is located directly below the container 12 situated in the pre-heating position;

the fumes which pass through the basket during the pre-heating step then pass through the combustion chamber 21.

The fume combustion chamber 21 may be equipped with burners, which are not shown here, which serve to burn all the residual organic and inorganic compounds contained in the fumes, and to assist the powders to deposit, so that the fumes may arrive at the processing and discharge plant at least partly free of these polluting substances which are harmful for the working life of the filter system.

The fume combustion chamber 21 also makes it possible to collect any residual scrap which falls from the container or basket 12 above.

The fume combustion chamber 21 is advantageously connected downstream with an intake and cleaning plant for the fumes.

In the pre-heating station 20b (FIG. 3), the bottom of the container 12 is connected to an upper aperture 21a of the combustion chamber 21 by means of its own aperture 27 for the outlet of the fumes.

When the scrap is being pre-heated, the valve 26 on the lower branch 22d is closed, while the valve 25 on the upper branch 22c is open; in this way, the fumes arriving from the furnace 11 pass through the fume discharge conduit 22 and are conveyed towards the cover 23.

The fumes therefore pass through the container 12 from the top, lapping and heating the scrap contained therein from the top towards the bottom, until they leave through the aperture 27, into the combustion chamber 21.

The fumes leave the combustion chamber 21 at a lower temperature, having given up at least part of their heat in the heat exchange with the scrap, and therefore they are easier to process and discharge.

Moreover, as they proceed from the top downwards inside the container or basket 12, they do not damage the opening systems of the bottom of the container or basket 12, thus preserving the integrity and working life of these systems.

Figure 4A:
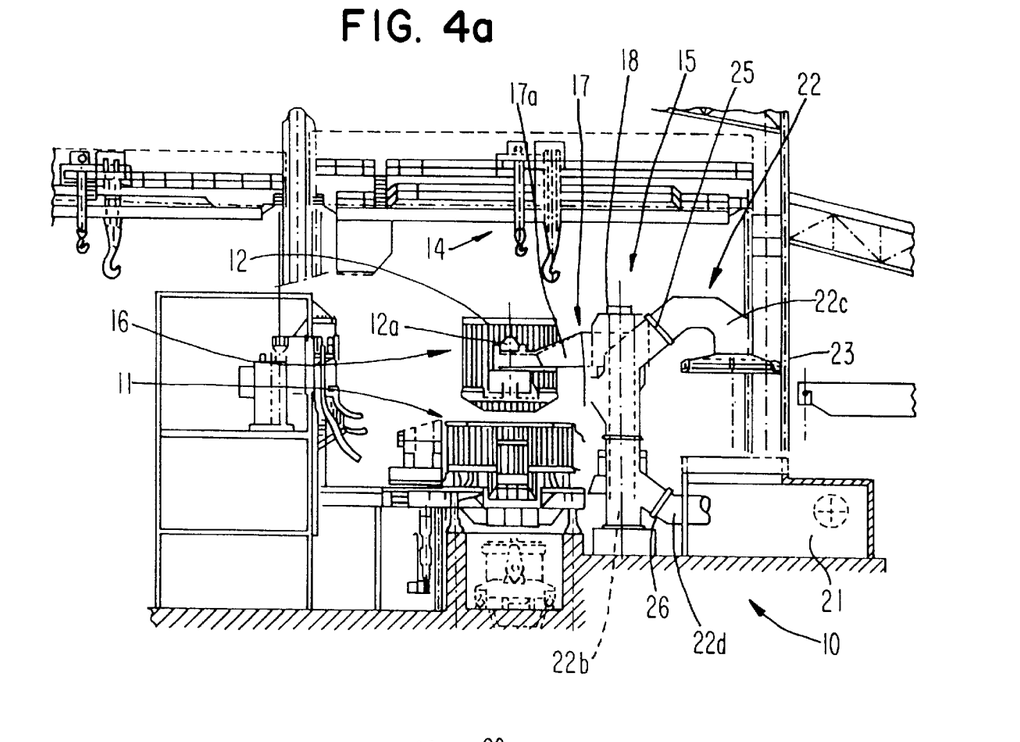

When the furnace 11 has finished its current melting cycle, the roof 11a is moved sideways (dotted lines in FIG. 1) and the manipulator arm 17, rising and rotating around the central pin 18, places the container 12 above the furnace 11, thus allowing the pre-heated scrap to be unloaded into the furnace 11 (FIG. 4).

Figure 4B:
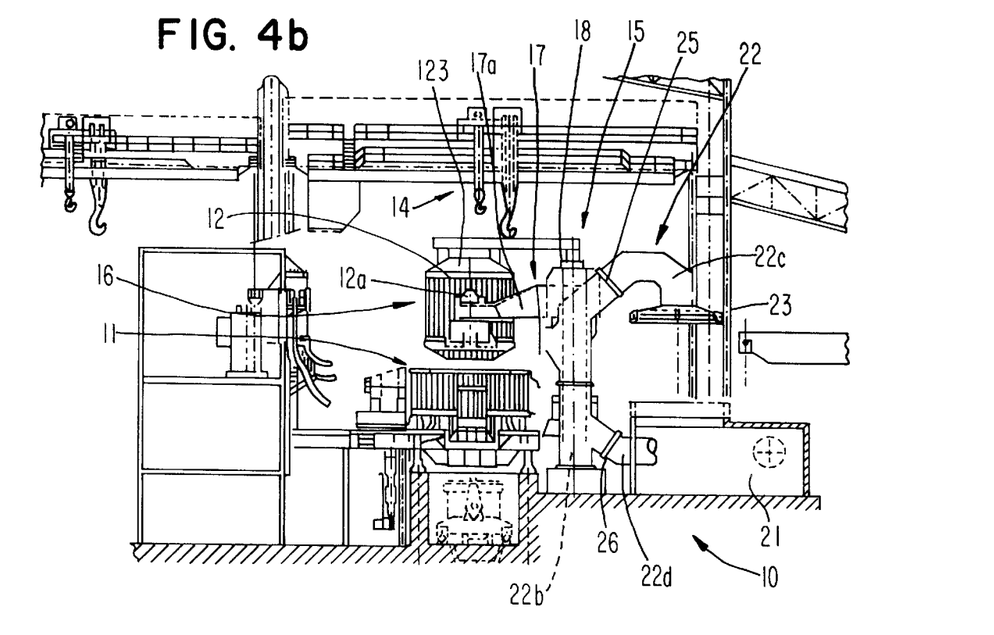

According to the variant shown in FIG. 4b, the container or basket 12 is associated with a second cover 123, solid with the manipulator arm 17, which moves with the basket 12 and closes it as it passes from its pre-heating position to its loading position.

The presence of the second cover 123 prevents any leakage of the fumes into the surrounding environment, thus limiting pollution, and also prevents the heat dispersing from the scrap which thus arrives hotter at the furnace.

When this operation is concluded, the manipulator arm 17 takes the container 12 back to the loading station 20a to begin a new filling cycle.

While the container 12 is maintained in the loading station 20a, the fumes arriving from the furnace 11 are conveyed directly into the combustion chamber 21, by closing the valve 25 of the upper branch 22c and opening the valve 26 of the lower branch 22d; in this condition the upper aperture 21a of the combustion chamber 21 is closed.

In the embodiment shown in FIG. 5, the electric furnace 11 is loaded alternately by two containers 12, respectively the first container 112 and the second 212.

In this embodiment, there are three stations 20 to house the containers 12, each of which having a structure (not shown here) to support the containers 12: a filling station 20a, a pre-heating station 20b and a supplementary, waiting station 20c.

When it has completed its first loading cycle, the first container 112 is arranged by the manipulator arm 17 in the supplementary waiting position 20c.

Then, the manipulator arm 17 picks up the second container 212 from the loading station 20a, where it has been loaded in the meantime, in this case by means of a conveyor belt 19, and places it in the pre-heating station 20b.

In the pre-heating position 20b, the second container 212 is connected at the upper part with the air-tight cover 23 and at the lower part with the combustion chamber 21, in order to heat the scrap contained therein.

While the scrap is being heated in the container 212, the manipulator arm 17 picks up the first container 112 from the supplementary waiting station 20c and places it in the loading station 20a where it is filled.

At the end of the melting cycle, the furnace 11 is loaded by means of the second container 212 which is subsequently placed in the supplementary waiting station 20c; the first container 112, which has been filled in the meantime, is then moved to the pre-heating station 20b to begin a new loading cycle.

According to a variant, in the supplementary waiting station 20c, one—for example the first 112—of the two containers 12 is loaded, while the other container 12—for example the second 212—is loaded in the loading station 20a (FIG. 5).

The containers 112, 212 are then placed in sequence in the pre-heating station 20b before being used to load the furnace 11.

The means to transport the scrap, in this case consisting of a conveyor belt 19, cooperating with the supplementary waiting station 20c (shown by a line of dashes) can consist of the same means which cooperate with the filling station 20a or can be autonomous means.

Figure 6A:
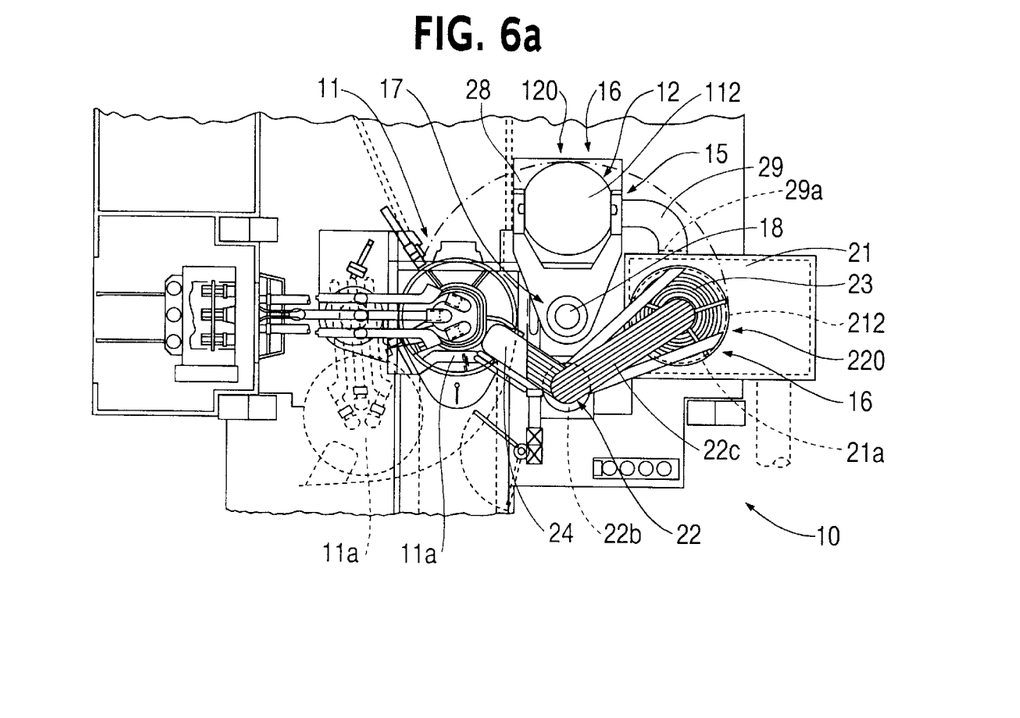
FIGS. 6a and 6b show a further embodiment of the loading system for electric arc furnaces according to the invention.
Figure 6B:
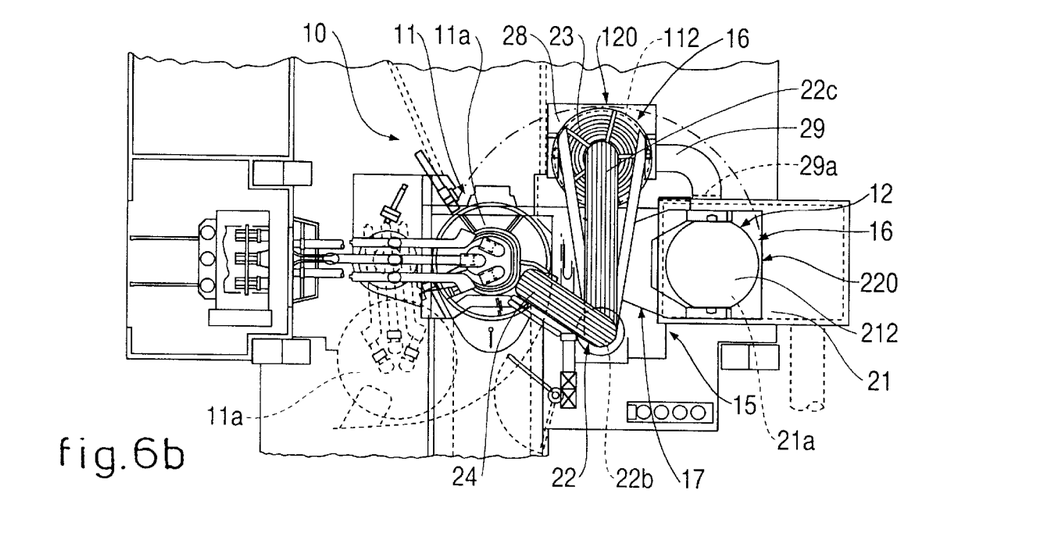

In the embodiment shown in FIGS. 6a and 6b, two containers 12 are used, the first container 112 and the second container 212, arranged in respective housing stations 120, 220, in which the loading step and the pre-heating step are alternately carried out.

In this case, the housing station 220 is obtained on the upper part of the combustion chamber 21, in such a way that the bottom of the second container 212 is connected with the upper aperture 21a of the combustion chamber 21.

The housing station 120 is obtained on a supporting structure 28 associated with a connection pipe 29 which is connected to the combustion chamber 21 and equipped with its own closure valve 29a.

In the embodiment shown, the upper branch 22c of the fume discharge conduit 22 can be extended telescopically and rotates with respect to the second section 22b; the fume discharge conduit 22 can therefore be associated alternately, together with the cover 23, with both the containers 112, 212.

In the loading cycle, the first container 112 is filled, by means which are not shown here, while the upper branch 22c of the fume discharge conduit 22 is arranged in cooperation with the second container 212, in order to heat the scrap contained therein, closing the second container 212 at the top by means of the air-tight cover 23 (FIG. 6a). In this condition, the valve 29a of the connection pipe 29 is kept closed, while the upper mouth 21a is open, thus allowing the fumes to enter the combustion chamber 21.

At the end of the melting cycle, the manipulator arm 17 takes the second container 212 above the electric furnace 11 in order to load it.

Subsequently, the second container 212 is taken back to its position 220 to be filled, while the upper branch 22c rotates and extends until it takes the air-tight cover 23 to cover the first container 112 so that the scrap contained therein may be heated (FIG. 6b).

During this heating step, the valve 29a is opened and allows the fumes to pass through into the combustion chamber 21, while at the same time the upper mouth 21a of the latter is closed.

The electric furnace 11 is subsequently loaded by means of the first container 112, while the upper branch 22c is arranged in cooperation with the second container 212.

Figure 7A:
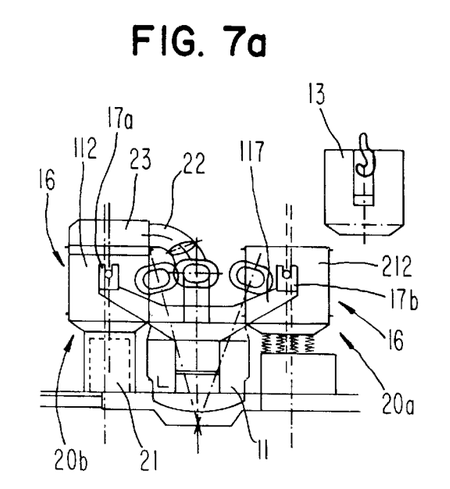
FIGS. 7a and 7b show a variant of the invention from the side and from above.
Figure 7B:
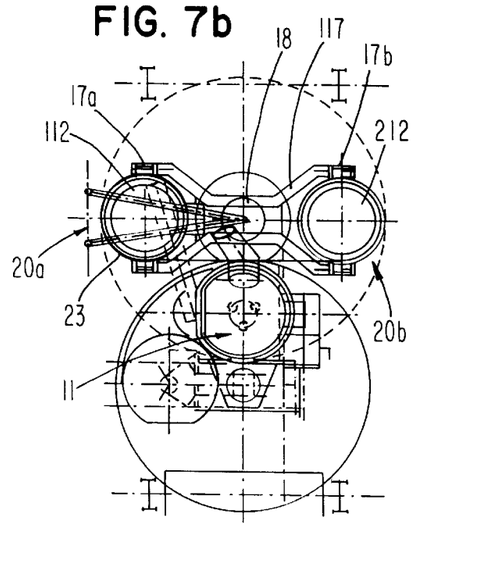

In the further embodiment shown in FIGS. 7a and 7b, a manipulator arm 117 of the double type is used, suitable to support and move two baskets or containers 112, 212 simultaneously.

In this embodiment, at least one of the two containers is always in the pre-heating step, in this case 112, while the other 212 is ready to be filled, in this case by a basket 13 moved on a bridge crane.

When pre-heating is completed, the air-tight cover 23 connected to the fume-discharge conduit 22 can be displaced from the container 112 to the container 212 in order to begin pre-heating the scrap contained therein, while the scrap in the container 112 is unloaded into the furnace 11.

In another embodiment, with every cycle the containers 112 and 212 invert their position, respectively to pre-heat and load the scrap, the air-tight cover 23 being simply raised and lowered to be associated alternately with one or another of the containers 112, 212.

With this embodiment, the times when the scrap is not being pre-heated are substantially reduced to nothing, and the spaces and movements are rationalised and optimised.

There may also be burners 31 and/or ventilators along the conduit 22 in order to regulate the rate of flow and/or the combustion of the fumes before they are sent inside the basket or container 12.

Apart from the embodiments described above, there are other possible embodiments which are not shown here, which use a larger number of loading elements 16 cooperating with respective and autonomous loading stations 20a and pre-heating stations 20b; these embodiments allow smaller loading elements 16, which are easier to manipulate, to be used.

What is claimed is:

1. Loading system for an electric arc furnace comprising a loading station into which raw material is suitable to be loaded in at least one loading element, a pre-heating station for said scrap and a pick-up and moving device provided with at least a manipulator arm rotating around a central pin to describe with one end part at least one portion of a circumference on which said furnace, said loading station and said pre-heating station lie, said manipulator arm being substantially equal in length to the radius of said circumference, said loading element being openable at an upper part and having a bottom able to be at least partly opened by means of movable elements, a covering roof being able to be selectively associated with said electric furnace and being movable from a position wherein it closes the furnace and a lateral position of non interference with said furnace, said roof including at least a hole to discharge the fumes from the furnace which is connected to a fume discharge conduit which is associated at an end with an air-tight cover to temporally close at the upper part at least said loading element, the system being characterized in that:

said loading station is distanced from said pre-heating station;

said loading element comprises a container selectively located in or removed from each of said loading and pre-heating stations;

said manipulator arm is to be moved vertically to cooperate selectively with said container to move it between said loading station, said pre-heating station and a position above said furnace;

in said pre-heating station, said container selectively cooperates at an upper part with said air-tight cover and at the lower part directly with a combustion chamber, wherein pre-heating fumes passing through said container and passing through the scrap from the top downwards, are partly burnt, and in that the air-tight cover is movable vertically and rotatably on a horizontal plane, said fume-discharge conduit being at least partly coaxial with the axis of rotation of said air-tight cover.

2. System as in claim 1, characterized in that it comprises a single element to load the scrap suitable to be selectively arranged in succession by said manipulator arm in a scrap-loading station, in said pre-heating station and in a position above the electric furnace in order to unload the scrap.

3. System as in claim 1, characterized in that it comprises two distinct elements to load the scrap arranged selectively and alternately in succession by said manipulator arm in a supplementary waiting station, in said loading station, in said pre-heating station and in a position above the electric furnace in order to unload the scrap.

4. System as in claim 3, characterized in that, after the scrap has been unloaded into the electric furnace, one of said two loading elements is suitable to be arranged by said manipulator arm in said supplementary waiting station, said manipulator arm then being suitable to remove the second of said two loading elements from said loading station and to arrange it in said pre-heating station.

5. System as in claim 1, characterized in that said supplementary waiting station cooperates with means to load the scrap in order to fill the relative loading elements.

6. System as in claim 5, characterized in that the same scrap-loading means cooperate alternately with said loading station and with said supplementary waiting station.

7. System as in claim 1, characterized in that said fume-discharge conduit is at least partly coaxial with the vertical axis of rotation and has a first branch connected with the air-tight cover and a second branch connected directly to said combustion chamber, said branches being governed by respective closing means with valves to send the fumes alternately inside said container or inside said combustion chamber.

8. System as in claim 1, characterized in that during the travel from said pre-heating station to said position above the furnace, said loading element is suitable to cooperate with a movable covering element assembled on the manipulator arm.

9. System as in claim 1, characterized in that said combustion chamber is equipped with burners.

10. System as in claim 1, characterized in that said combustion chamber is connected downstream with intake and cleaning means for the fumes.

11. System as in claim 1, characterized in that it comprises two distinct loading elements, respectively the first and the second, associated with respective housing stations, said housing stations alternately comprising said loading station and said pre-heating station, said fume-discharge conduit and said air-tight cover being translatable from one housing station to the other.

12. System as in claim 1, characterized in that it comprises a double manipulator arm to simultaneously support and move two distinct containers in their respective positions of pre-heating or loading.

13. System as in claim 1, characterized in theat said fume-discharge conduit includes at least one of burners and ventilators.

* * * * *